US008353009B2

(12) United States Patent
Sathish (10) Patent No.: US 8,353,009 B2
(45) Date of Patent: Jan. 8, 2013

(54) METHOD AND APPARATUS FOR PROVIDING CONTEXT ACCESS WITH PROPERTY AND INTERFACE OBFUSCATION

(75) Inventor: Sailesh Kumar Sathish, Tampere (FI)

(73) Assignee: Nokia Corporation, Espoo (FI)

( * ) Notice: Subject to any disclaimer, the term of this patent is extended or adjusted under 35 U.S.C. 154(b) by 542 days.

(21) Appl. No.: 12/571,710

(22) Filed: Oct. 1, 2009

(65) Prior Publication Data
US 2011/0083162 A1 Apr. 7, 2011

(51) Int. Cl.
*H04L 29/06* (2006.01)
(52) U.S. Cl. .............................................. 726/3; 726/30
(58) Field of Classification Search .................. 726/3, 30
See application file for complete search history.

(56) References Cited

U.S. PATENT DOCUMENTS

| | | | |
|---|---|---|---|
| 5,878,415 A * | 3/1999 | Olds ..................................... 1/1 |
| 5,941,947 A * | 8/1999 | Brown et al. ................. 709/225 |
| 7,958,267 B1 * | 6/2011 | Eiras et al. .................... 709/246 |
| 2002/0007482 A1 * | 1/2002 | Cirne ............................... 717/2 |
| 2003/0028606 A1 * | 2/2003 | Koopmans et al. ........... 709/206 |
| 2008/0092052 A1 * | 4/2008 | Mathews et al. .............. 715/736 |
| 2008/0205403 A1 * | 8/2008 | Akyol et al. ................... 370/392 |
| 2008/0281852 A1 | 11/2008 | Sathish |
| 2009/0089078 A1 * | 4/2009 | Bursey .............................. 705/1 |
| 2010/0100967 A1 * | 4/2010 | Douglas et al. ................. 726/27 |

FOREIGN PATENT DOCUMENTS
WO WO 2008/007338 A2 1/2008

OTHER PUBLICATIONS

International Search Report and Written Opinion for International Application No. PCT/IB2010/002483 mailed Jan. 18, 2011.
Sathish, S., et al; "Context Service Framework for the Mobile Internet"; Proceedings of the International Workshop on System Support for Future Mobile Computing Applications; 2006 (FUMCA '06). ISBN 978-0-7695-2729-1 ; ISBN 0-7695-2729-9.
Waters, K., et al; W3C Candidate Recommendation; "Delivery Context: Client Interfaces (DCCI) 1.0, Accessing Static and Dynamic Delivery Context Properties"; Sections 1, 1.1, 2.1, 4, 4.3; Dec. 21, 2007.

* cited by examiner

*Primary Examiner* — Kambiz Zand
*Assistant Examiner* — Aubrey Wyszynski
(74) *Attorney, Agent, or Firm* — Alston & Bird LLP (57) ABSTRACT

An apparatus for enabling provision of context access with property or interface obfuscation may include at least one processor and at least one memory including computer program code. The at least one memory and the computer program code may be configured, with the processor, to cause the apparatus to perform at least receiving, from an application, a request for access to property information corresponding to a provider node in which the access is provided via a delivery context client interface based context model, determining access rights associated with the application based on a classification of the application, enabling masking of a portion of information associated with the access rights in response to the classification of the application defining a corresponding subclass restriction, and enabling access to the property via the context model based on the access rights associated with the application and subject to the masking. A corresponding method and computer program product are also provided.

20 Claims, 4 Drawing Sheets

METHOD AND APPARATUS FOR PROVIDING CONTEXT ACCESS WITH PROPERTY AND INTERFACE OBFUSCATION

TECHNOLOGICAL FIELD

Embodiments of the present invention relate generally to communication interface technology and, more particularly, relate to a method and apparatus for enabling access control to be provided with obfuscation of the interfaces providing such access.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

In some situations, it may be desirable for an application (e.g., a web based application) to have the ability to access information or objects from a device providing information to the application. For example, context data including device data related to capabilities, current operating state and/or other device data that may be static and/or dynamic may be useful information for the application to access. In this regard, context data may be associated with content stored on a device in order to provide information which might assist in identifying data of interest. Context data is data that characterizes a particular situation at any point in time and may be either static or dynamic. Metadata is another form of information which may be associated with content to assist in ordering and identifying the content. Metadata may be considered to be data that provides additional data about data and is generally thought of as being static. When media content is recorded or an application inquires about situational characteristics related to an object, the context data associated with the content or object may be referenced. The context data may be used by applications for different purposes, such as generating metadata or performing an adaptation based on the context. When used for adaptation purposes, no context is typically stored, but is instead used dynamically.

Delivery Context Client Interface (DCCI) is a mechanism through which applications can access device data such as delivery context information using, for example, a Document Object Model (DOM) like interface. As such, DCCI may act as a consumer interface for web applications (consumers) and providers of data to a tree-like interface. Providers of data can be any static or dynamic sources providing information such as device location, device orientation, screen brightness, battery strength, and many others. Although DCCI may be useful in providing information to applications about device status, DCCI has been considered by some to include an outdated event specification and thus, extensions to the interfaces offered by DCCI may be desirable.

BRIEF SUMMARY

A method, apparatus and computer program product are therefore provided for enabling access control to be provided with obfuscation of the interfaces providing such access. Accordingly, for example, a new model incorporating functionality for providers of context data to extend the standard list of common interfaces may be provided. However, for example, depending on the types of applications accessing the interfaces, the properties and/or interfaces themselves may be masked or obfuscated in some situations. Thus, some embodiments of the present invention may enable an extension of the interfaces available for various properties through a standardized application programming interface (API) set with certain properties and/or the interfaces enabled to be masked based on the application accessing the corresponding interface.

In one exemplary embodiment, a method of providing context access with property and/or interface obfuscation is provided. The method may include receiving, from an application, a request for access to property information corresponding to a provider node in which the access is provided via a delivery context client interface based context model, determining access rights associated with the application based on a classification of the application, enabling masking of a portion of information associated with the access rights in response to the classification of the application defining a corresponding subclass restriction, and enabling access to the property via the context model based on the access rights associated with the application and subject to the masking.

In another exemplary embodiment, a computer program product for providing context access with property and/or interface obfuscation is provided. The computer program product includes at least one computer-readable storage medium having computer-executable program code instructions stored therein. The computer-executable program code instructions may include program code instructions for receiving, from an application, a request for access to property information corresponding to a provider node in which the access is provided via a delivery context client interface based context model, determining access rights associated with the application based on a classification of the application, enabling masking of a portion of information associated with the access rights in response to the classification of the application defining a corresponding subclass restriction, and enabling access to the property via the context model based on the access rights associated with the application and subject to the masking.

In another exemplary embodiment, an apparatus for providing context access with property and/or interface obfuscation is provided. The apparatus may include at least one processor and at least one memory including computer program code. The at least one memory and the computer program code may be configured, with the processor, to cause the apparatus to perform at least receiving, from an application, a request for access to property information corresponding to a provider node in which the access is provided via a delivery context client interface based context model, determining access rights associated with the application based on a classification of the application, enabling masking of a portion of information associated with the access rights in response to the classification of the application defining a corresponding subclass restriction, and enabling access to the property via the context model based on the access rights associated with the application and subject to the masking.

Embodiments of the invention may provide a method, apparatus and computer program product for employment in web based, or other network based operating environments. As a result, for example, device users may enjoy improved capabilities with respect to applications and services accessible via the device.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data", "content", "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a physical storage medium (e.g., volatile or non-volatile memory device), can be differentiated from a "computer-readable transmission medium," which refers to an electromagnetic signal.

Some embodiments of the present invention may be employed to, for example, provide an expanded set of properties (e.g., both remote properties and in-device properties) that may be supported by a set of standard interfaces. Furthermore, embodiments of the present invention may enable the obfuscation or masking of the properties and/or interfaces based on the application accessing device properties. Accordingly, communication may be provided to enable consumers or applications to request certain services such as property initializations, expected data formats, granularity of data, data abstractions, service invocations, and/or the like.

Figure 1:
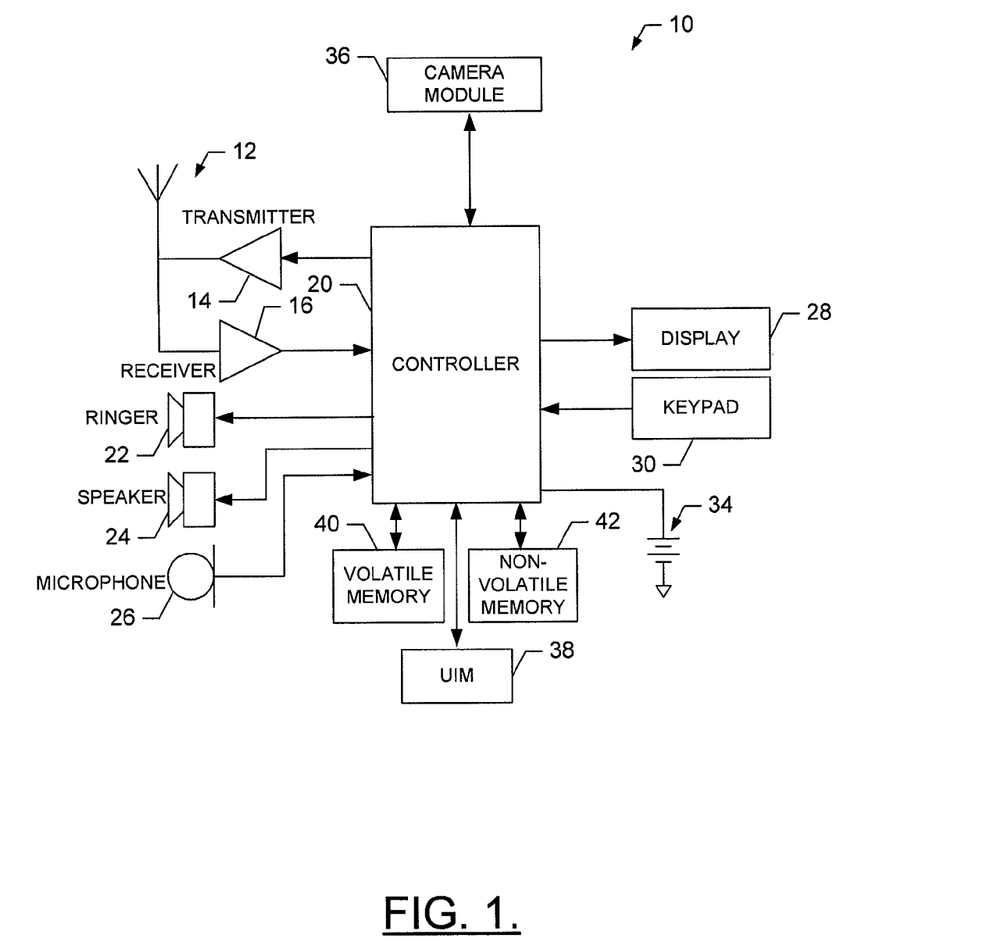
FIG. 1 is a schematic block diagram of a mobile terminal according to an exemplary embodiment of the present invention.

FIG. 1, one exemplary embodiment of the invention, illustrates a block diagram of a mobile terminal 10 that may benefit from embodiments of the present invention. It should be understood, however, that a mobile terminal as illustrated and hereinafter described is merely illustrative of one type of device that may benefit from embodiments of the present invention and, therefore, should not be taken to limit the scope of embodiments of the present invention. While several embodiments of the mobile terminal 10 may be illustrated and hereinafter described for purposes of example, other types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, may readily employ embodiments of the present invention.

The mobile terminal 10 may include an antenna 12 (or multiple antennas) in operable communication with a transmitter 14 and a receiver 16. The mobile terminal 10 may further include an apparatus, such as a controller 20 or other processing element, that provides signals to and receives signals from the transmitter 14 and receiver 16, respectively. The signals may include signaling information in accordance with the air interface standard of the applicable cellular system, and/or may also include data corresponding to user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

It is understood that the apparatus, such as the controller 20, may include circuitry implementing, among others, audio and logic functions of the mobile terminal 10. For example, the controller 20 may comprise a digital signal processor device, a microprocessor device, and various analog to digital converters, digital to analog converters, and/or other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 24, a ringer 22, a microphone 26, a display 28, and a user input interface, which may be coupled to the controller 20. The user input interface, which allows the mobile terminal 10 to receive data, may include any of a number of devices allowing the mobile terminal 10 to receive data, such as a keypad 30, a touch display (not shown), a microphone or other input device. In embodiments including the keypad 30, the keypad 30 may include numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are used to operate the mobile terminal 10, as well as optionally providing mechanical vibration as a detectable output.

Although not required, in some embodiments, the mobile terminal 10 includes a media capturing element, such as a camera, video and/or audio module, in communication with the controller 20. The media capturing element may be any means for capturing an image, video and/or audio for storage, display or transmission. For example, in an exemplary embodiment in which the media capturing element is a camera module 36, the camera module 36 may include a digital camera capable of forming a digital image file from a captured image. As such, the camera module 36 includes all hardware, such as a lens or other optical component(s), and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image.

In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to a JPEG standard format or another like format.

The mobile terminal 10 may further include a user identity module (UIM) 38, which may generically be referred to as a smart card. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), or any other smart card. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The non-volatile memory 42 may additionally or alternatively comprise an electrically erasable programmable read only memory (EEPROM), flash memory or the like. The memories may store any of a number of pieces of information, and data, used by the mobile terminal 10 to implement the functions of the mobile terminal 10. For example, the memories may include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, i.e., cell id identity or cell id information, with which the mobile terminal 10 is in communication.

Figure 2:
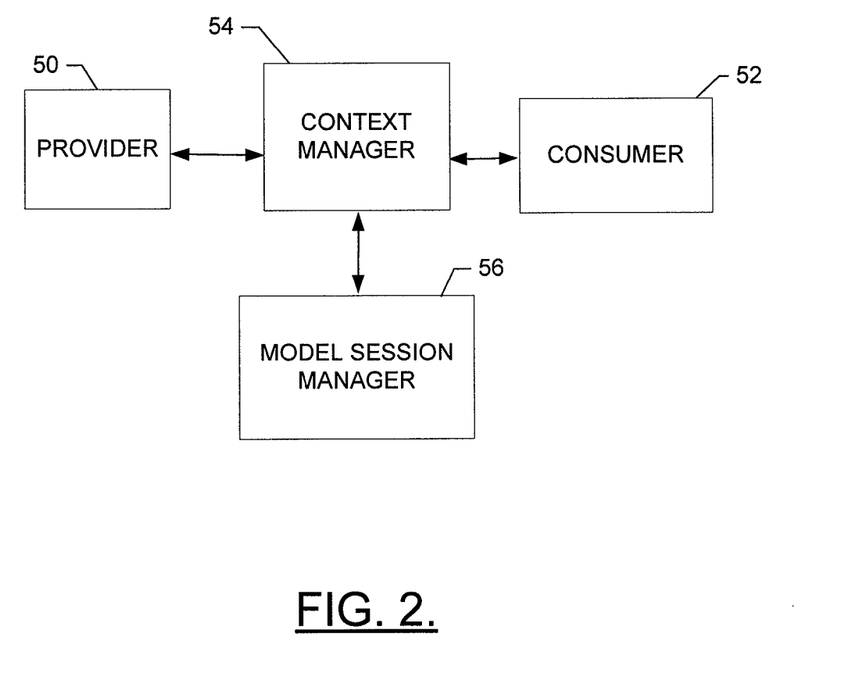
FIG. 2 illustrates a system according to an exemplary embodiment of the present invention.

In an exemplary embodiment, the mobile terminal 10 of FIG. 1 may be associated with a provider or consumer of content, services or resources in a communication network. An example of a basic structure for provide access for a consumer to access a property (or properties) of a provider is shown by way of example in FIG. 2. In this regard, FIG. 2 illustrates a system including a provider 50, which may be a device or entity offering specific properties or resources to other devices, applications or consumers such as consumer 52 in a smart space or other communication network environment. The provider 50 may offer the consumer 52 access to the properties in accordance with a context model 54. The context model 54 may be maintained by a model session manager 56. The model session manager 56 may be an entity or other device configured to maintain the context model 54 and define access policies that govern the provision of properties for access by other devices and the set of interfaces that enable access to such properties. Some embodiments of the present invention relate to the manner by which access to such interfaces and properties is provided and, more specifically, to providing a mechanism by which property and interface information may be masked in some cases, even though access is still provided to qualifying consumers (e.g., applications).

An exemplary embodiment of the invention will now be described with reference to FIG. 3, in which certain elements of an apparatus for enabling the provision of property and interface obfuscation for context access are displayed. The apparatus of FIG. 3 may be employed, for example, on the mobile terminal 10 of FIG. 1 and/or the model session manager 56 of FIG. 2. However, it should be noted that the apparatus of FIG. 3, may also be employed on a variety of other devices, both mobile and fixed (e.g., computers or servers), and therefore, the present invention should not be limited to application on devices such as the mobile terminal 10 of FIG. 1 or the model session manager 56 of FIG. 2. Alternatively, embodiments may be employed on a combination of devices including, for example, those listed above. Accordingly, embodiments of the present invention may be embodied wholly at a single device (e.g., the mobile terminal 10 or the model session manager 56 of FIG. 2) or by devices in a client/server relationship. Furthermore, it should be noted that the devices or elements described below may not be mandatory and thus some may be omitted in certain embodiments.

Figure 3:
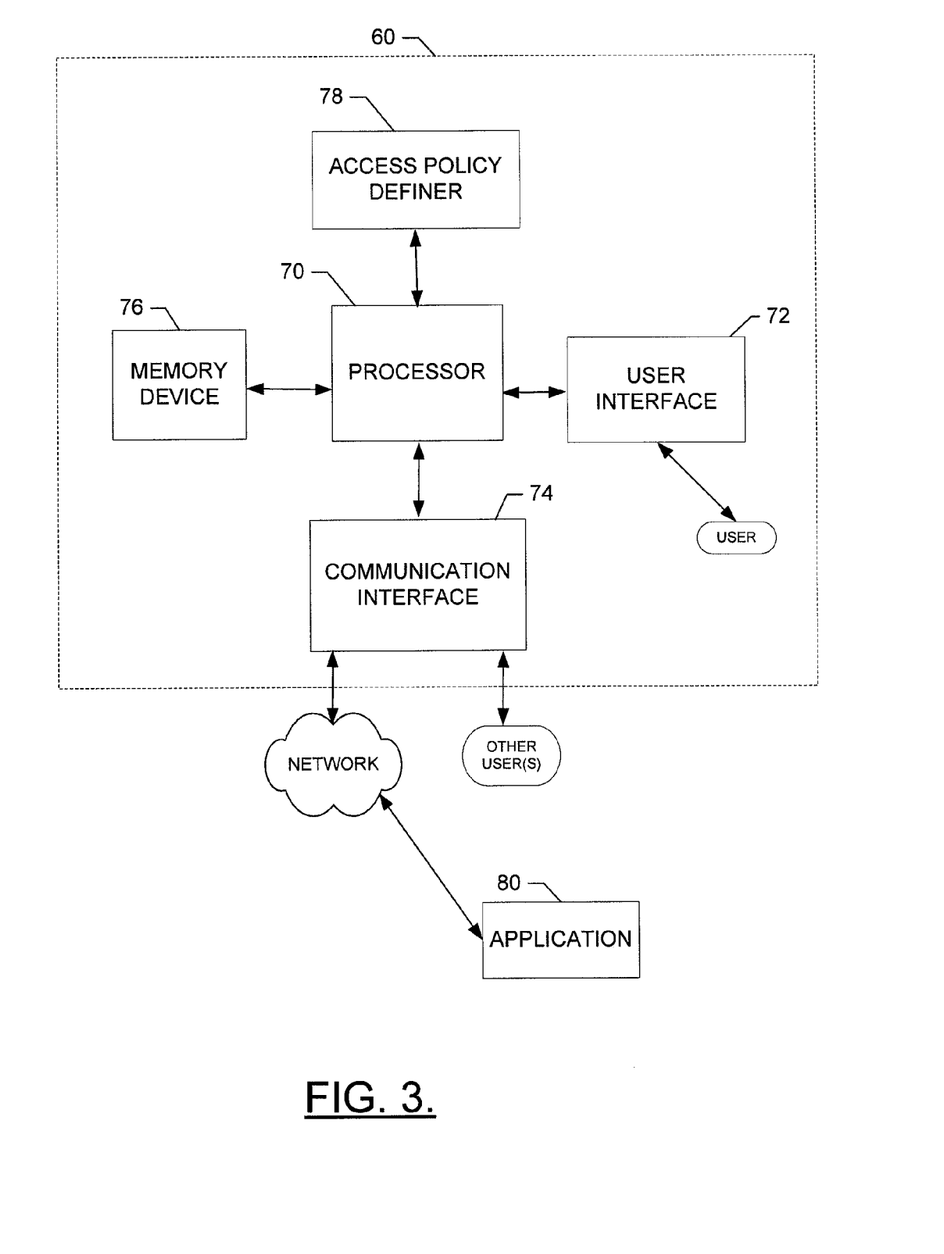
FIG. 3 is a schematic block diagram of an apparatus for providing context access with property and/or interface obfuscation according to an exemplary embodiment of the present invention.

Referring now to FIG. 3, an apparatus 60 for enabling the provision of property and interface obfuscation for context access is provided. The apparatus 60 may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device). The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an exemplary embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a communication device (e.g., the mobile terminal 10), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an exemplary embodiment, the apparatus 60 may be capable of establishing communication with the model session manager 56. As such, for example, the model session manager 56 may be included within another entity accessible to the apparatus 60 via a network as shown in FIG. 3. However, in some embodiments, the apparatus 60 may actually be a portion of the model session manager 56. As such, the model session manager 56 may be embodied at a mobile terminal, computer, server, or other similar device and may include processor, memory, user and communication interfaces similar to the apparatus 60 of FIG. 3.

The model session manager 56 may be any means such as a device or circuitry embodied in hardware, software or a combination of hardware and software that is configured to perform the corresponding functions of the model session manager 56 as described herein. The model session manager 56 may be configured to maintain (e.g., via processor execution of stored instructions in a memory device) the context model 54 or at least control access to the context model 54 by providers. The context model 54 may define a standard set of interfaces for each service provider and for consumers (e.g., applications such as application 80 of FIG. 3). As such, the model session manager 56 may include or be a portion of an access control module providing control over access to properties that are accessible via the interfaces associated with the context model 54.

In an exemplary embodiment, the processor 70 may be embodied as, include or otherwise control an access policy definer 78. In some embodiments, the access policy definer 78 may be configured to communicate with the context model 82 (e.g., via the model session manager 56 or the communication interface 74) to handle device context information regarding the apparatus 60 to one or more applications (e.g., application 80) that may act as consumers with respect to device context information provided (e.g., via DCCI) by the access policy definer 78. In this regard, for example, the access policy definer 78 may be configured to coordinate the definition of access policy rules for consumers to access properties of the provider via interfaces that support such access. Application 80 may be an example of a web application or some other network application for which information about properties associated with the apparatus 60 of FIG. 2 may be useful to facilitate access to such properties or services associated with interfaces provided to the application 80 acting in a consumer capacity.

The access policy definer 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the access policy definer 78 as described herein. Thus, in examples in which software is employed, a device or circuitry (e.g., the processor 70 in one example) executing the software forms the structure associated with such means.

In an exemplary embodiment, the access policy definer 78 may be configured to supply (e.g., if the apparatus 60 is embodied at a mobile terminal) or receive (e.g., if the apparatus 60 is embodied at the model session manager 56) a service request. The service request may identify the provider and, based on an access policy for providers listed within the model session manager 56, provide an access pointer to provide access to services associated with the provider. A corresponding provider representation may therefore be defined within the context model 54 to identify context data associated with properties of the provider that are accessible to consumers. The context model 54 may therefore provide a standard set of interfaces for each provider and consumer. Consumers may use the standard set of interfaces in order to get access to the context model 54.

In addition, each provider representation within the context model 54 may extend the standard set of interfaces (e.g., interfaces that are used for read-only access to the provider data by the consumer) with a specific set of interfaces enabling more powerful context services. The specific set of interfaces may include functionality to facilitate initialization of or changing of the settings of context providers. The specific set of interfaces may also enable the establishment of asynchronous or synchronous access overriding event models, access to higher resolution data or access to even more abstracted context data. Numerous other functionalities are also possible in addition to the example functionalities listed above. However, since functionality exists to enable different types or classes of applications to have broad access to various interfaces, embodiments of the present invention may further provide a robust framework for enabling restriction of access to such interfaces to certain applications.

In this regard, there are different types or classes of applications that may desire to access user and device context. Moreover, there are certain applications that may be trusted while certain other applications are not trusted. The trusted applications may be associated with or otherwise possess a signed certificate that is verifiable from a browser or the trusted applications may be provided explicit trust certification by the users themselves. In a context management framework, applications may be mapped as corresponding with a particular type or class that may define a status of the application for purposes of making access determinations. The mapping of applications to corresponding classes may be a predefined characteristic of the context model 54 or may be defined by the access policy definer 78.

Although any particular naming convention that is desired may be employed, one exemplary embodiment of the present invention may divide applications into various classes identified by a corresponding letter designation. For example, class A applications may be considered to be fully trusted applications with valid certifications. Access may be granted to class A applications responsive to user confirmation. Class B applications may include user certified applications that may not have or be associated with a valid certificate. Class C applications may include applications that are certified by groups to which the user may belong. As an example, class C applications may include applications with group logins made through OpenID. Class D applications may include applications not having a valid certificate but trusted by users to a certain extent. Class D applications may have only read access to context data. Class E applications may include applications not having a valid certificate and not trusted by a user at all. No context access at all may be granted to class E applications.

It should be noted that the classes of applications could include more classifications or less classifications than those listed above and the nomenclature associated with the classes may vary. Furthermore, the access rules associated with each class may be different. Accordingly, for example, classifications could be more broadly or more narrowly defined in some situations. However, in some instances, a layered approach to access provision may be provided. In this regard, for example, to more narrowly define classifications, one or more of the classes (and in some cases each class) may include one or more corresponding subclasses to which a schema may be attached. The subclasses may derive the full functionality of each class, but may also define additional restrictions. In an exemplary embodiment, any application that runs on the browser may be classified as belonging to either a class or a subclass.

When the application 80 attempts to utilize properties of a particular provider, a browser of the device utilizing the application 80 may employ the class information to offer or otherwise provide access to a first set of features for the application 80. The subclass may be used for fine-tuning access rights for a particular application or set of applications. In other words, class related definitions may be used to govern access to certain features, whereas subclass information may be used to add additional restrictions beyond those associated with class related restrictions. The concept of classes and subclasses may be employed to empower the context model 54 to provide multi-level access to interfaces and to keep management of such interfaces relatively simple.

In some embodiments, schemas may be defined to belong to subclasses. Schemas associated with corresponding subclasses may mask property lists associated with such subclasses while otherwise providing the full rights afforded to the corresponding classes to which the subclasses belong. In other words, if an application's class provides a particular level of access to properties associated with a provider, the subclass of the application may be employed to determine whether to mask the property lists in the context model 54 even though access is still provided. Alternatively or additionally, subclass information may form a basis for masking certain interfaces or property rights and taking precedence over the property and interface rights of the corresponding classes. The classes and/or subclasses may be defined or otherwise maintained by the access policy definer 78.

In an exemplary embodiment, each class may be associated with a set of basic rights and applications that fall into the corresponding classes may be entitled to those rights associated with their respective classes. Associations between classes and the rights associated with such classes may be predefined by the model session manager 56 or some other network operator entity. However, in some examples, associations between classes and the rights associated with each respective class may be provided via the access policy definer 78. As such, for example, when a provider supplies a service request to the model session manager 56, the provider may request modification to, or inclusion of, access policy instructions maintained by the model session manager 56.

In an exemplary embodiment, the management of associating access rights with respective classes or subclasses may be managed by defining a token to correspond to each respective access right. Accordingly, each right may have a corresponding token associated therewith and the tokens may be used to describe the corresponding rights. In some examples, the token is a noun tag that can be interpreted by the framework. The tokens may be hosted in a suitable XML (extensible markup language) or other format. The names or tags associated with specific tokens may vary according to design choice. In an exemplary embodiment, some examples of specific rights that may be associated with tokens are listed below. However, the rights listed below do not constitute an exhaustive listing of rights, or even a minimum listing of rights. Instead, the listing below is merely an example of some rights that may be associated with tokens in some example embodiments. Example rights include:
1. Access to device dynamic data deemed not private: example battery signal strength, network provider, network bandwidth, screen and other hardware properties;
2. Access to PIM (personal information management) modules and PIM data;
3. Access to obfuscated data for PIM;
4. Access to obfuscated data for non-private data;
5. Access to on-device services;
6. Access to on-device obfuscated services;
7. Rights to change on-device service data/application data;
8. Rights to invoke on-device services/applications;
9. Access to nearby devices;
10. Access to nearby services;
11. Access to obfuscated services and devices; and
12. Rights to change nearby (external) device, service data Providers of context data can provide additional interfaces in addition to the set of standard interfaces that the context model 54 provides for each representation of the provider. The providers provide a description of the interfaces to the model session manager 56 when making the representation within the context model 54.

The providers, when providing the description of the interfaces, map the interfaces towards one or more class within an access control module associated with the model session manager 56. In an exemplary embodiment, for every interface that the provider provides, the provider may describe what data the interface uses, which of the rights amongst those described each right maps to (e.g., whether the corresponding interface provides an abstract or obfuscated data output, or whether such interface provides means to manipulate PIM data, etc.). In some examples, it may be mandatory that each interface within the set of interfaces that the provider provides is mapped to a specific access right. The provider may identify the token corresponding to each access right provided. As such, for example, the provider may include the access policy definer 78 in order to identify tokens corresponding to the rights provided and the tokens, or at least the rights provided, may include at least some rights that mask properties and/or interfaces while still providing access to such properties or interfaces.

In an exemplary embodiment, when providing a set of interfaces, the provider can mention an "ALT" tag with a single interface or group of interfaces and map the "ALT" tag with another interface. Interfaces with the ALT tag may then be evaluated against the current access control and, if the interface is not suitable for the current access, the interface provided with the "ALT" tag may be used if it satisfies the access right. The ALT tag may therefore be used to find alternate interfaces if a specific level of access is not allowed within the current application context.

In an exemplary embodiment, each provider may be associated with a corresponding entry within an access control map document. The access control map document may be maintained by the access control module associated with the model session manager 56. For each class, the particular provider interfaces may be computed. For example, the provider may have a full interface set in Class A, while having only a limited interface set in class C. The provider may also have a set of ALT interfaces in class D. The specific access rights for each class may be determined according to design choice. The subclasses may list or otherwise define the properties that are allowed for a particular class of application within a corresponding context. The application, user and device context may be used to determine which subclass schema is loaded so that a mask is provided over specified properties and those properties that are listed within the schema are allowed. The subclasses may be created dynamically by the user or they may be pre-loaded by the manufacturer or service provider.

Accordingly, in embodiments of the present invention, a device or service may provide an input in the form of property information (e.g., application state information, initialization values, settings information, requests for information, and/or the like) to be made available to a consumer via extended interfaces. The property information and/or the interfaces may have access limitations placed on them based on a classification of the consumer application desiring access. Moreover, the property information and/or the interfaces may be masked, in some cases, to restrict the application's ability to view certain property information while still maintaining access rights otherwise provided for the corresponding application class. In this regard, for example, classes may be provided to classify applications according to the access rights afforded to each respective class. Subclasses may then be defined for some applications to provide restrictions to the access rights of such applications. In some cases, at least one subclass may be associated with schema provided to mask a property list of the context model for an application in the subclass. Accordingly, embodiments of the present invention may provide for increased flexibility for context access to be managed in relation to enabling providers to define limitations to access in relation to property and interface obfuscation.

Figure 4:
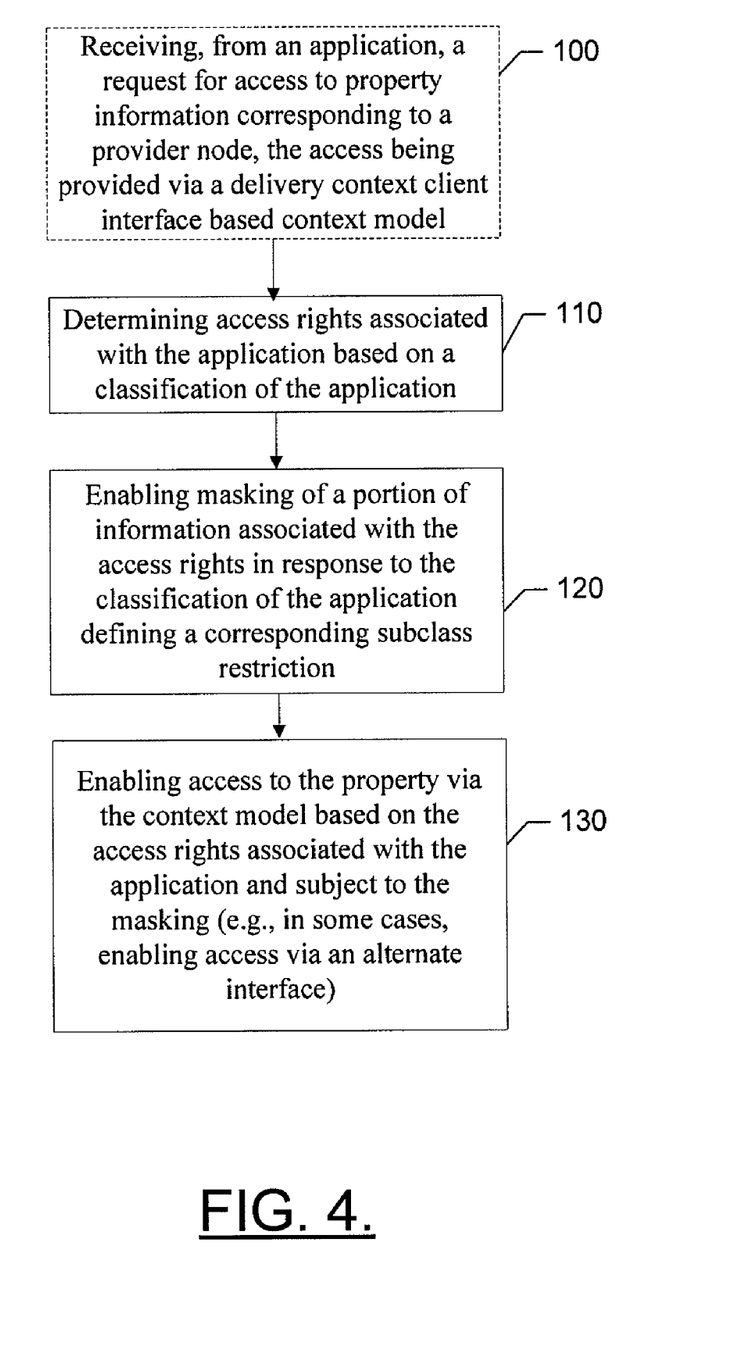
FIG. 4 is a block diagram according to an exemplary method for enabling the provision of context access with property and/or interface obfuscation according to an exemplary embodiment of the present invention.

FIG. 4 is a flowchart of a system, method and program product according to exemplary embodiments of the invention. It will be understood that each block or step of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s) or step(s). These computer program instructions may also be stored in a computer-readable storage memory (as opposed to a computer-readable transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing context access with property or interface obfuscation may include receiving, from an application, a request for access to property information corresponding to a provider node at operation 100. The access may be provided via a delivery context client interface based context model. The method may further include determining access rights associated with the application based on a classification of the application at operation 110. The method may also include enabling masking of a portion of information associated with the access rights in response to the classification of the application defining a corresponding subclass restriction at operation 120, and enabling (e.g., via a processor) access to the property via the context model based on the access rights associated with the application and subject to the masking at operation 130.

In some embodiments, certain ones of the operations above may be modified or further amplified as described below. Modifications or amplifications to the operations above may be performed in any order and in any combination. In this regard, for example, determining access rights may include determining access rights of the application based on a class of the application, the class being associated with a set of basic access rights, and a subclass of the application, the subclass comprising a schema defining a property list, property or interface to be masked. Alternatively or additionally, determining access rights may include determining access rights based on one or more corresponding tokens associated with the classification of the application in which the tokens are each descriptive of the corresponding access rights. In some cases, enabling access to the property may include enabling access to an alternate interface that considers context. The alternate interface may be provided by the provider node.

In an exemplary embodiment, an apparatus for performing the method of FIG. 4 above may comprise one or more processors (e.g., the processor 70) configured to perform some or each of the operations (100-130) described above. The processor may, for example, be configured to perform the operations (100-130) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-130 may comprise, for example, corresponding ones of the processor 70, the access policy definer 78, the model session manager 56 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
    at least one processor; and
    at least one memory including computer program code, the at least one memory and the computer program code configured to, with the processor, cause the apparatus to at least:
    receive, from an application, a request for access to property information corresponding to a provider node, the access being provided via a delivery context client interface, based context model;
    determine access rights associated with the application based on a classification of the application;
    enable masking of a portion of information associated with the access rights in response to the classification of the application defining a corresponding subclass restriction; and
    enable access to the property via one or more interfaces defined by the context model based on the access rights associated with the application and subject to the masking.

2. The apparatus of claim 1, wherein the at least one memory and computer program code are configured to, with the at least one processor, cause the apparatus to determine the access rights of the application based on a class of the application, the class being associated with a set of basic access rights, and a subclass of the application, the subclass comprising a schema defining a property list to be masked.

3. The apparatus of claim 1, wherein the at least one memory and computer program code are configured to, with the at least one processor, cause the apparatus to determine the access rights of the application based on a class of the application, the class being associated with a set of basic access rights, and a subclass of the application, the subclass comprising a schema defining a property to be masked.

4. The apparatus of claim 1, wherein the at least one memory and computer program code are configured to, with the at least one processor, cause the apparatus to determine the access rights of the application based on a class of the application, the class being associated with a set of basic access rights, and a subclass of the application, the subclass comprising a schema defining an interface to be masked.

5. The apparatus of claim 1, wherein the at least one memory and computer program code are configured to, with the at least one processor, cause the apparatus to determine access rights based on one or more corresponding tokens associated with the classification of the application, the tokens each being descriptive of the corresponding access rights.

6. The apparatus of claim 1, wherein the at least one memory and computer program code are configured to, with the at least one processor, cause the apparatus to enable access to an alternate interface that considers context.

7. The apparatus of claim 6, wherein the at least one memory and computer program code are configured to, with the at least one processor, cause the apparatus to receive the alternate interface defined by the provider node.

8. A method comprising:
   receiving, from an application, a request for access to property information corresponding to a provider node, the access being provided via a delivery context client interface based context model;
   determining access rights associated with the application based on a classification of the application;
   enabling masking of a portion of information associated with the access rights in response to the classification of the application defining a corresponding subclass restriction; and
   enabling, via a processor, access to the property via one or more interfaces defined by the context model based on the access rights associated with the application and subject to the masking.

9. The method of claim 8, wherein determining access rights comprises determining access rights of the application based on a class of the application, the class being associated with a set of basic access rights, and a subclass of the application, the subclass comprising a schema defining a property list to be masked.

10. The method of claim 8, wherein determining access rights comprises determining access rights of the application based on a class of the application, the class being associated with a set of basic access rights, and a subclass of the application, the subclass comprising a schema defining a property to be masked.

11. The method of claim 8, wherein determining access rights comprises determining access rights of the application based on a class of the application, the class being associated with a set of basic access rights, and a subclass of the application, the subclass comprising a schema defining an interface to be masked.

12. The method of claim 8, wherein determining access rights comprises determining access rights based on one or more corresponding tokens associated with the classification of the application, the tokens each being descriptive of the corresponding access rights.

13. The method of claim 8, wherein enabling access to the property comprises enabling access to an alternate interface that considers context.

14. A computer program product comprising at least one computer-readable non-transitory storage medium having computer-executable program code instructions stored therein, the computer-executable program code instruction comprising:
   program code instructions for receiving, from an application, a request for access to property information corresponding to a provider node, the access being provided via a delivery context client interface based context model;
   program code instructions for determining access rights associated with the application based on a classification of the application;
   program code instructions for enabling masking of a portion of information associated with the access rights in response to the classification of the application defining a corresponding subclass restriction; and
   program code instructions for enabling access to the property via one or more interfaces defined by the context model based on the access rights associated with the application and subject to the masking.

15. The computer program product of claim 14, wherein program code instructions for determining access rights include instructions for determining access rights of the application based on a class of the application, the class being associated with a set of basic access rights, and a subclass of the application, the subclass comprising a schema defining a property list to be masked.

16. The computer program product of claim 14, wherein program code instructions for determining access rights include instructions for access rights of the application based on a class of the application, the class being associated with a set of basic access rights, and a subclass of the application, the subclass comprising a schema defining a property to be masked.

17. The computer program product of claim 14, wherein program code instructions for determining access rights include instructions for determining access rights of the application based on a class of the application, the class being associated with a set of basic access rights, and a subclass of the application, the subclass comprising a schema defining an interface to be masked.

18. The computer program product of claim 14, wherein program code instructions for determining access rights include instructions for determining access rights based on one or more corresponding tokens associated with the classification of the application, the tokens each being descriptive of the corresponding access rights.

19. The computer program product of claim 14, wherein program code instructions for enabling access to the property include instructions for enabling access to an alternate interface that considers context.

20. The computer program product of claim 19, wherein the program code instructions for enabling access to the property include instructions for receiving the alternate interface defined by the provider node.

* * * * *